(12) United States Patent
Kawamura et al.

(10) Patent No.: US 10,994,903 B2
(45) Date of Patent: May 4, 2021

(54) PLASTIC CAP AND PRODUCTION METHOD THEREOF

(75) Inventors: Hideaki Kawamura, Tochigi (JP); Takashi Uemura, Hiroshima (JP)

(73) Assignee: DAIKYO SEIKO, LTD., Tochigi (JP)

( * ) Notice: Subject to any disclaimer, the term of this patent is extended or adjusted under 35 U.S.C. 154(b) by 1518 days.

(21) Appl. No.: 13/282,884

(22) Filed: Oct. 27, 2011

(65) Prior Publication Data

US 2012/0118894 A1 May 17, 2012

(30) Foreign Application Priority Data

Nov. 17, 2010 (JP) .............................. JP2010-256654

(51) Int. Cl.
*B65D 51/00* (2006.01)
*B29C 65/00* (2006.01)
(Continued)

(52) U.S. Cl.
CPC .......... *B65D 51/002* (2013.01); *A61J 1/1406* (2013.01); *A61J 1/1425* (2015.05); *A61J 1/1431* (2015.05); *B29C 65/42* (2013.01); *B29C 65/76* (2013.01); *B29C 66/126* (2013.01); *B29C 66/131* (2013.01); *B29C 66/21* (2013.01); *B29C 66/542* (2013.01); *B29C 66/545* (2013.01); *B29C 66/61* (2013.01); *B65D 51/18* (2013.01); *B29C 65/08* (2013.01); *B29C 66/71* (2013.01); *B29C 66/712* (2013.01); *B29L 2031/565* (2013.01); *B65D 2251/009* (2013.01); *B65D 2251/0015* (2013.01); *B65D 2251/0056* (2013.01)

(58) Field of Classification Search
CPC ........ B65D 41/10; B65D 53/00; B65D 55/10; B65D 50/00; B65D 50/045; B65D 50/046; B65D 51/002; Y10S 206/807; Y10S 215/10; B29C 66/304
USPC ........................... 220/378; 264/445; 219/148
See application file for complete search history.

(56) References Cited

U.S. PATENT DOCUMENTS 2,987,610 A * 6/1961 Heinz Steigerwald .. 219/121.13
3,524,042 A * 8/1970 Bennett ..................... 219/150 R
(Continued)

FOREIGN PATENT DOCUMENTS

EP 2070834 11/2008
GB 1095216 12/1967
(Continued)

*Primary Examiner* — Anthony D Stashick
*Assistant Examiner* — Blaine G Neway
(74) *Attorney, Agent, or Firm* — Hamre, Schumann, Mueller & Schumann, P.C.

(57) ABSTRACT

Disclosed is a plastic cap useful for steadfastly maintaining a sealed state created in a container having a mouth with an opening by sealing the opening with a sealing member. The cap has a cap main body and a cover portion integrated with the main body via at least one bridge portion. The main body has a base portion and a top wall. The bridge portion is formed of a synthetic plastic filled in at least one fusion-bonding hole having a diameter of from 0.3 to 3 mm and arranged extending through at least one, preferably one of the main body or cover portion such that the main body and cover portion are integrally fusion-bonded by the bridge portion and the cover portion can be separated from the main body by breaking the bridge portion with hands. A production method of the plastic cap is also disclosed.

13 Claims, 11 Drawing Sheets

(51) Int. Cl.
*B29C 65/76* (2006.01)
*B65D 51/18* (2006.01)
*A61J 1/14* (2006.01)
*B29C 65/42* (2006.01)
B29C 65/08 (2006.01)
B29L 31/56 (2006.01)

(56) References Cited

U.S. PATENT DOCUMENTS

| | | | | | |
|---|---|---|---|---|---|
| 3,545,343 | A | * | 12/1970 | Orbeck | 92/165 R |
| 3,688,080 | A | * | 8/1972 | Cartwright et al. | 219/137 R |
| 3,899,116 | A | * | 8/1975 | Mims | B23K 20/10 |
| | | | | | 228/110.1 |
| 4,865,680 | A | * | 9/1989 | Pierson | B29C 65/08 |
| | | | | | 156/497 |
| 5,288,350 | A | * | 2/1994 | Kita | 156/73.1 |
| 7,622,694 | B2 | * | 11/2009 | Kan | B23K 26/0734 |
| | | | | | 219/121.6 |
| 8,181,328 | B2 | * | 5/2012 | Suigetsu | B29C 65/08 |
| | | | | | 29/428 |
| 2009/0145876 | A1 | * | 6/2009 | Kawamura | B65D 51/002 |
| | | | | | 215/353 |

FOREIGN PATENT DOCUMENTS

| | | | |
|---|---|---|---|
| JP | 61116525 | * | 6/1986 |
| JP | 09-238998 | | 9/1997 |
| NL | 6500387 | | 7/1965 |
| WO | WO84/03874 | | 10/1984 |

* cited by examiner

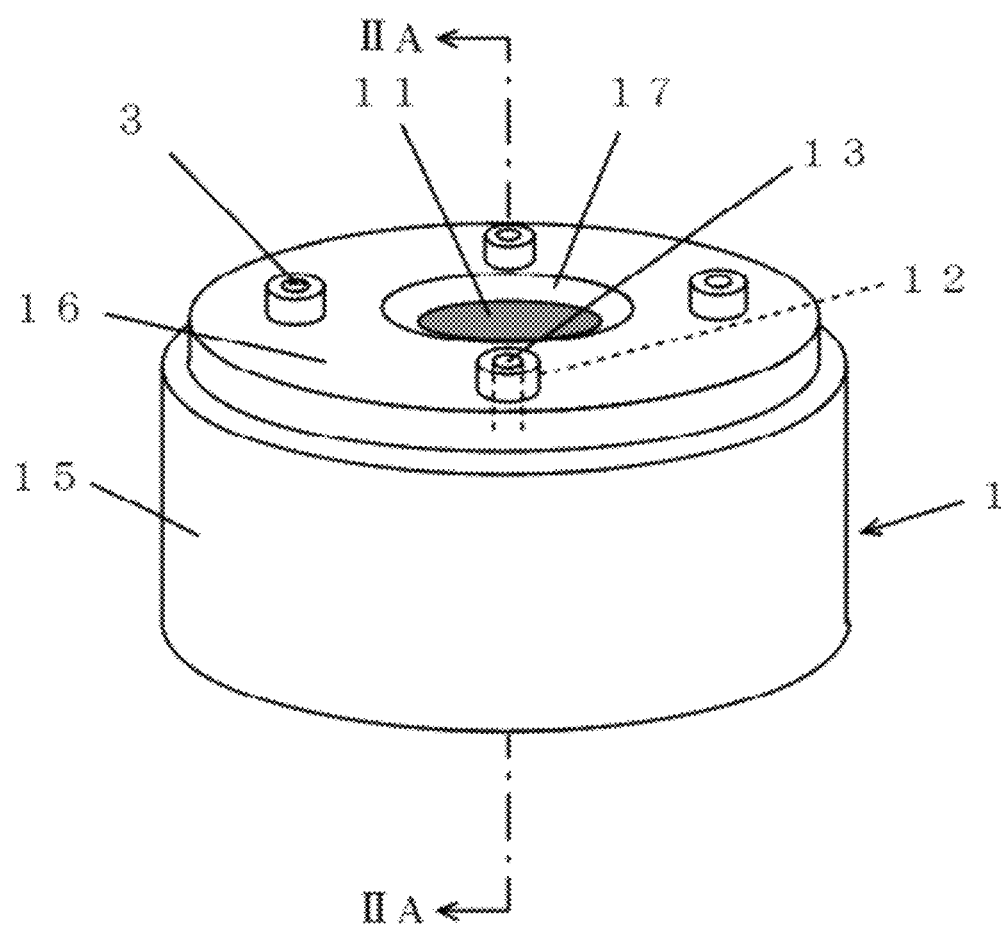

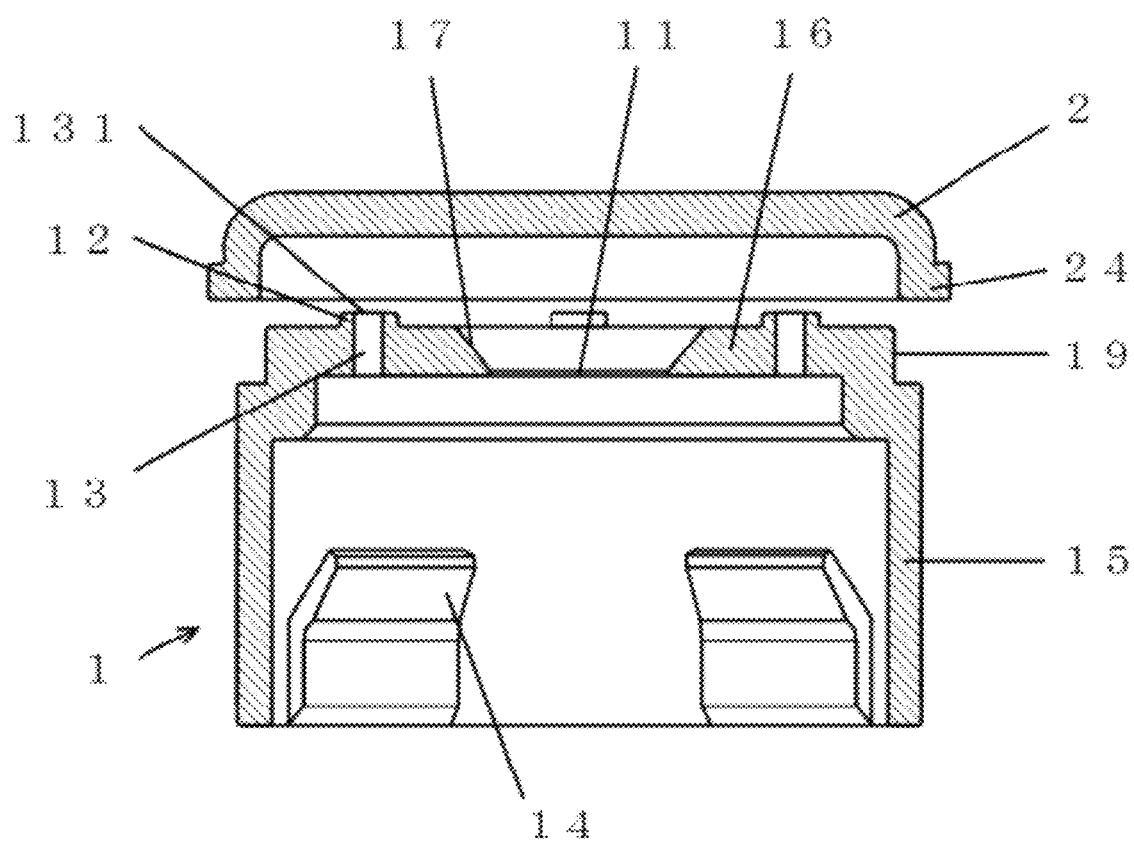

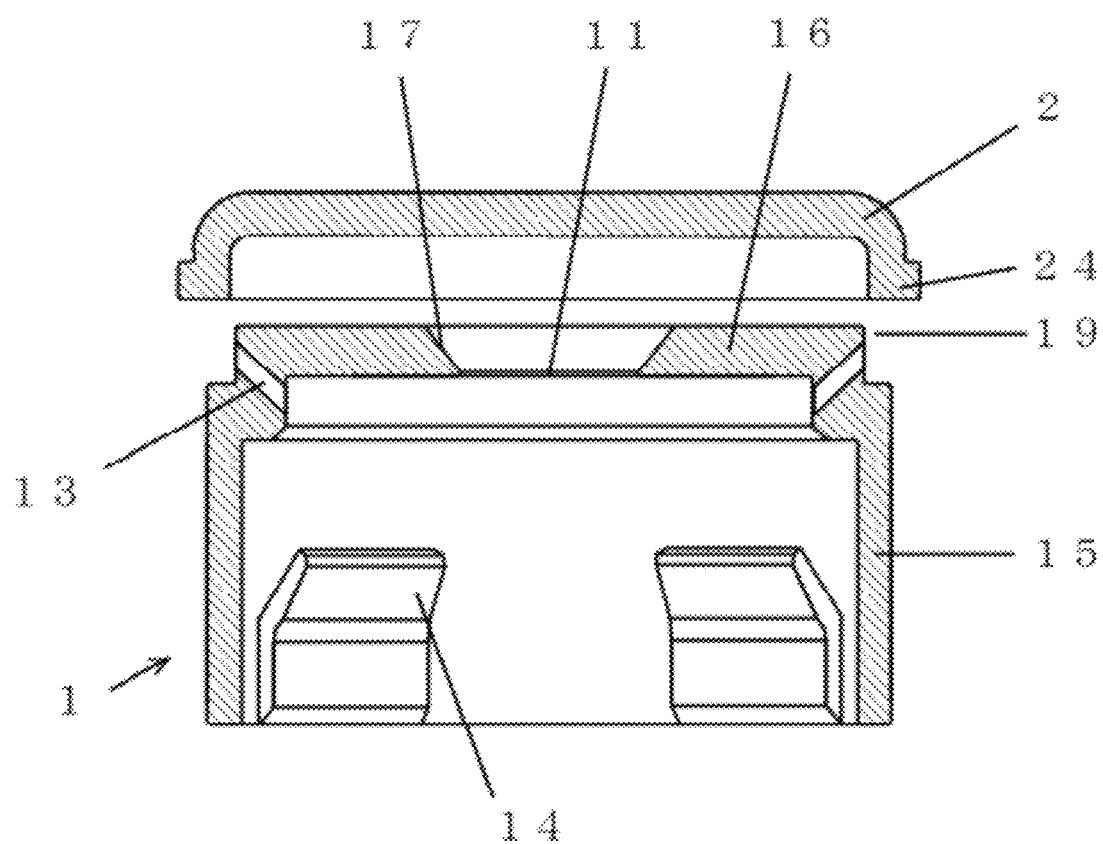

PLASTIC CAP AND PRODUCTION METHOD THEREOF

CROSS-REFERENCE TO RELATED APPLICATION

This application claims the priority of Japanese Patent Application 2010-256654 filed Nov. 17, 2010, which is incorporated herein by reference.

BACKGROUND OF THE INVENTION

1. Field of the Invention

The present invention relates to a plastic cap useful for reliably sealing a mouth of a container. More specifically, the present invention relates to a plastic cap useful for steadfastly maintaining a sealed state created in a container having a mouth with an opening defined therein by sealing the opening with a sealing member such as a rubber plug. The present invention also relates to a production method of such a plastic cap.

2. Description of the Related Art

A container to be used as a package is required to have a function to protect its content from the outside such that the content can be prevented from any change in quality. Especially for containers to be used for drugs, foods, cosmetics or the like, there is a strong demand to maintain the quality of the drugs or the like placed in them. Main bodies of these containers and sealing members for sealing their mouths, therefore, need to be formed with materials that would undergo no interaction with the drugs or the like. In addition, upon distributing or otherwise transferring drugs or the like or storing them over a long time after they are placed in containers and are sealed with sealing members, the sealed state has to be reliably maintained. Especially when the contents are drugs, it is extremely important to more reliably maintain the highly sealed state created in the containers by the sealing members. Specifically as drug containers out of these containers, vials, cartridges, infusion bottles, infusion bags and the like are known. These known drug containers are selectively used depending on the preparation forms, volumes, administration methods and the like of drugs.

Generally with a drug placed in such a container, its mouth is tightly sealed, for example, with an elastic sealing member such as a rubber plug or flat packing, and moreover, a contrivance is made to maintain the sealed state without failure. For the maintenance of the sealed state, a variety of methods are known including, for example, a method that fits a rubber plug in a mouth of a vial or the like and applies a plastic or aluminum cap to cover the mouth with the rubber plug fitted therein, thereby preventing separation of the fitted rubber plug and firmly fixing it, a method that welds a plastic mouth-sealing part, which includes a flat packing and is generally called a "closure", on a mouth of a container such as an infusion bottle, and so on.

When the drug as the content of the container is an injectable solution, the injectable solution is used by piercing a sealing member such as a rubber plug with a syringe needle upon use and transferring the drug as the content into a syringe in the sealed state without opening the mouth of the container. When the drug is an infusion solution, its infusion is performed by piercing the sealing member with a needle connected to an intravenous catheter or the like. To facilitate such use as mentioned above, such a cap for a drug container is, therefore, provided with a window portion formed to expose a part of a sealing member when the cap is applied to the drug container. To protect the sealing member, which is exposed through the window portion, from contamination in the course of distribution of the drug, it is a common practice to cover a top wall, which constitutes the cap and defines the window portion (hereinafter called the "cap window") therein, with a protective film or a plastic or aluminum cover.

Conventionally, such a cover is kept integral with a cap main body until shortly before use of the content in a container, for example, by physically fitting the cover in the cap window (not shown), or as shown in FIG. 6, by applying an adhesive to upper surfaces 121 of protuberances 12 arranged on a top wall (upper wall) 16 of a cap main body 1 and bonding the cap main body 1 with a lower surface of a cover portion 2. Other connection methods include to apply ultrasonic waves to weld the upper surfaces 121 of the protuberances 12 and the lower surface of the cover portion 2 together by frictional heat without using any adhesive, with the upper surfaces 121 of the protuberances 12 and the lower surface of the cover portion 2 being kept in contact with each other, or to integrally mold the top wall 16 of the cap main body 1 and the cover portion 2 (see JP-A-09-238998). Nonetheless, the physically-fitted cover may accidentally separate, the joining by ultrasonic welding, an adhesive or the like is accompanied by unavoidable variations in joint strength among products, and the bonding with the adhesive involves a concern about possible effects of a solvent, which is contained in the adhesive, on the drug. With the above-described method that includes integral molding, on the other hand, the joint strength is relatively stabilized among products but is accompanied by problems in that a limitation is imposed on the shape of a cap and molds of complex structures are needed to result in higher production cost.

SUMMARY OF THE INVENTION

Therefore, an object of the present invention is to provide a plastic cap, which is free from accidental separation of its cover portion, is stable in the joint strength of the cover portion among its products, permits readily separation of the cover portion from a cap main body by hands upon use, has a high degree of freedom in product shape, and moreover, is suited especially for use with a drug container. Another object of the present invention is to provide its production method.

These objects can be achieved by the present invention to be described hereinafter. Described specifically, in one aspect of the present invention, there is provided a plastic cap useful for steadfastly maintaining a sealed state created in a container having a mouth with an opening defined therein by sealing the opening with a sealing member, wherein the plastic cap has at least a cap main body and a cover portion integrated with the main body via at least one bridge portion; the cap main body has a base portion, which is configured to permit surrounding the mouth of the container when the cap is applied to the mouth, and a top wall integrally arranged in conjunction with the base portion; the cover portion is arranged facing the top wall of the cap main body; the at least one bridge portion is formed of a synthetic plastic filled in at least one fusion-bonding hole having a diameter of from 0.3 to 3 mm and arranged extending through at least one, preferably one of the cap main body and cover portion such that the cap main body and cover portion are integrally fusion-bonded by the at least one bridge portion and the cover portion can be separated from the cap main body by breaking the at least one bridge portion with hands. As appreciated from the foregoing, the term "at least one bridge portion" as used herein means a portion formed of a synthetic plastic filled in a like number of fusion-bonding hole and integrally joining a cap main body and a cover portion together such that the cover portion can be separated from the cap main body by hands.

Preferably, at least one protuberance, which has a bore formed in conjunction with the at least one fusion-bonding hole, may be arranged on an upper surface of the top wall of the cap main body or on a lower surface of the cover portion. The lower surface is facing the upper surface. It is also preferred that at least one protuberance is arranged on an upper surface of the top wall of the cap main body or on a lower surface of the cover portion, the lower surface is facing the upper surface, and the at least one fusion-bonding hole is arranged through the surface, which is facing the protuberance, at a location opposite to the protuberance.

It is also preferred that on the upper surface of the top wall of the cap main body or the lower surface of the cover portion, the lower surface is facing the upper surface, and at a location opposite to the at least one protuberance, at least one recessed portion for fixing the protuberance or at least one fixing portion configured to fit on an outer circumference of the protuberance is formed. Three to five bridge portions as described above may preferably be arranged with angular intervals therebetween.

It is also preferred that at least one land or claw portion is arranged on an inner wall of the base portion of the cap main body to engage an annular lip arranged on an outer circumference of the mouth of the container, a window portion is centrally arranged through the top wall of the cap main body, and the cover portion is configured to cover at least the window portion. Further, the plastic cap may further comprise the sealing member to be placed between the opening of the mouth of the container and the top wall of the cap main body upon capping.

In another aspect of the present invention, there is also provided a production method of a plastic cap useful for steadfastly maintaining a sealed state created in a container having a mouth with an opening defined therein by sealing the opening with a sealing member, said plastic cap having at least a cap main body and a cover portion integrated with the main body via at least one bridge portion, and said cap main body having a base portion, which is configured to permit surrounding the mouth of the container, and a top wall integrally arranged in conjunction with the base portion, wherein upon integrating, via the at least one bridge portion, the cover portion with the cap main body at a position facing the top wall, a molten synthetic plastic is filled and allowed to solidify in at least one fusion-bonding hole having a diameter of from 0.3 to 3 mm and arranged extending through at least one, preferably one of the top wall of the cap main body and the cover portion to form the at least one bridge portion such that the cap main body and cover portion are integrally fusion-bonded by the at least one bridge portion and the cover portion can be separated from the cap main body by breaking the at least one bridge portion with hands.

According to the present invention, it is possible to provide a plastic cap, which is free from accidental separation of its cover portion, is stable in the joint strength of the cover portion among its products, permits readily separation of the cover portion from a cap main body by hands upon use, has a high degree of freedom in product shape, and moreover, is suited especially for use with a drug container. The plastic cap provided by the present invention has a cap main body and a cover portion integrated with the main body via at least one bridge portion. The bridge portion is formed of a synthetic plastic filled and allowed to solidify in a fusion-bonding hole having a diameter of from 0.3 to 3 mm and arranged extending through at least one of the cap main body and cover portion. As fusion bonding between the cap main body and the cover portion hence takes place at only an opening of the fusion-bonding hole, preferably at only a bore of a protuberance, said bore being formed in conjunction with the fusion-bonding hole, they can be joined or fusion-bonded together with extremely stable joint or fusion-bond strength without occurrence of substantial variations among products. Further, the integration of the cap main body and the cover portion can be easily achieved, for example, by injection molding, and moreover, the filling of the molten synthetic plastic at the time of the fusion bonding is needed only to the fusion-bonding hole. Accordingly, the cap main body and cover portion each have a high degree of freedom in shape, thereby bringing about such advantages that the structures of molds can be simplified and the quantity of the molten synthetic plastic to be used for the fusion bonding can be reduced.

BRIEF DESCRIPTION OF THE DRAWINGS

FIG. 1 is a perspective view of a cap main body of a plastic cap according to a first embodiment of the present invention as viewed from the above.

FIG. 2A is a cross-sectional view of the cap main body of FIG. 1 and its cover portion as viewed in a direction corresponding to the direction of arrows IIA-IIA of FIG. 1; and FIG. 2B is a cross-sectional view showing a modification of the first embodiment, in which fusion-bonding holes are formed at locations different from fusion-bonding holes in the first embodiment.

DETAILED DESCRIPTION OF THE PREFERRED EMBODIMENTS

Figure 5:
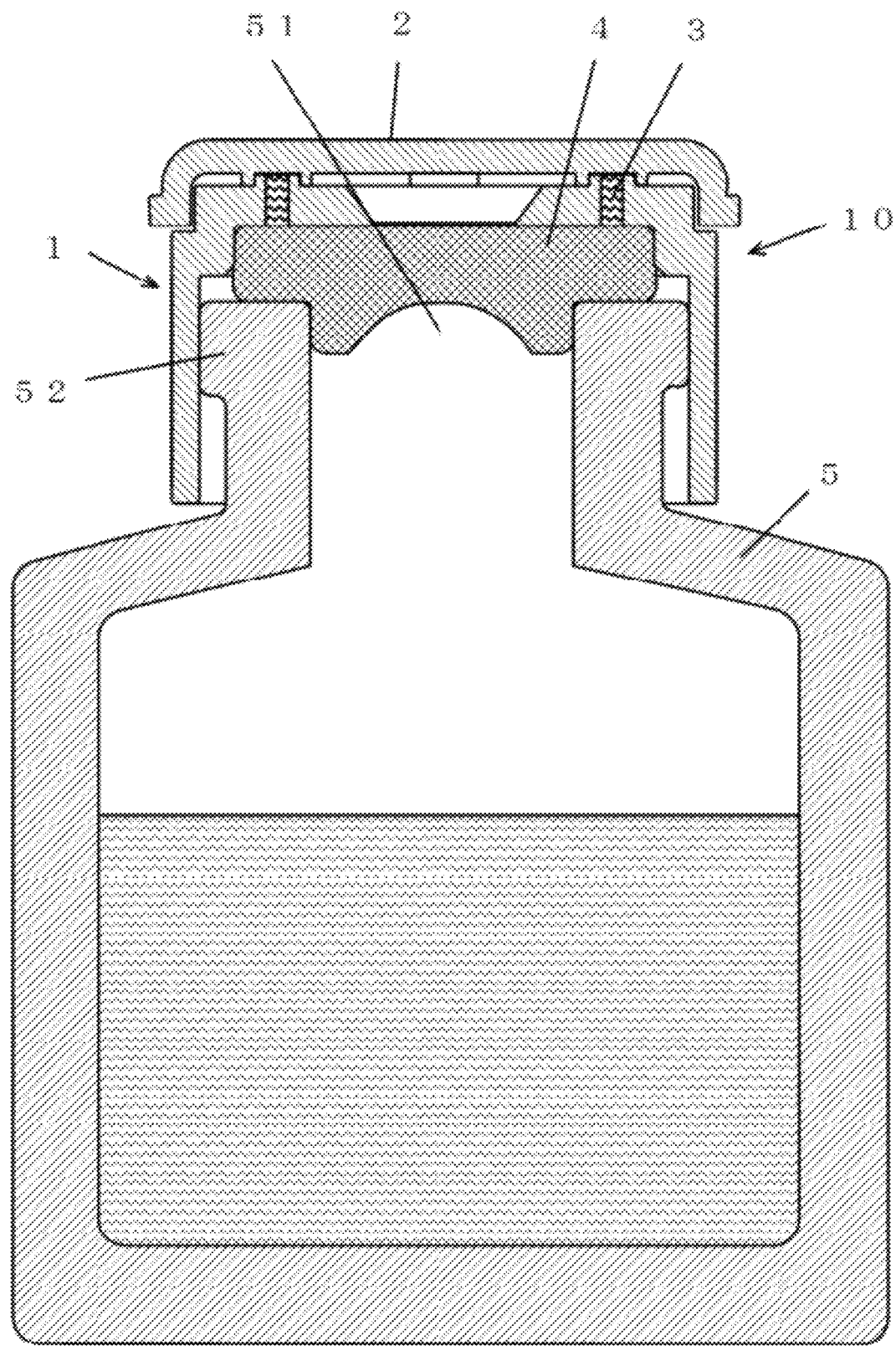
FIG. 5 is a cross-sectional view of a vial and the plastic cap according to the first modification (FIG. 3B) of the second embodiment of the present invention applied to the vial in combination with the rubber plug as illustrated in FIG. 4A.

Referring next to the accompanying drawings that show best modes for practicing the present invention, the present invention will be described in further detail. It is to be noted that like reference numerals indicate like elements of structure throughout the drawings. As shown in FIG. 5, a plastic cap 10 according to the first embodiment of the present invention can be used to conveniently and steadfastly maintain a sealed state created in a vial 5 as a container by fitting a rubber plug 4 as a sealing member in an opening 51 arranged in a mouth of the vial 5 to seal the opening 51.

The cap 10 according to the first embodiment of the present invention can be used for a container that stores a drug, food, cosmetic or the like. As high sealing property can be maintained by applying the cap 10, it is suited to use the cap 10 especially as a part of a package for a drug. The sealed state in the vial 5 can be steadfastly and stably maintained, for example, when subsequent to the filling of the drug in the vial 5 in a clean room, the rubber plug 4 as the sealing member is fitted in the opening 51 of the vial 5 to bring the interior of the vial 5 into the sealed state and the cap 10 is then applied over the rubber plug 4. Upon application of the cap 10 to the vial 5, lands (not shown) or claw portions 14 (see FIG. 3B) arranged on an inner wall of a cap main body 1 undergo an elastic deformation owing to their flexibility to ride over an annular rip 52 of the vial 5, and subsequently return to their original shape. As a consequence, the lands or the claw portions 14 come into engagement with the annular lip 52, and therefore, the cap 10 is fixedly secured on the vial 5 in such a state that it by no means separates through normal handling (under normal force).

Figure 3A:
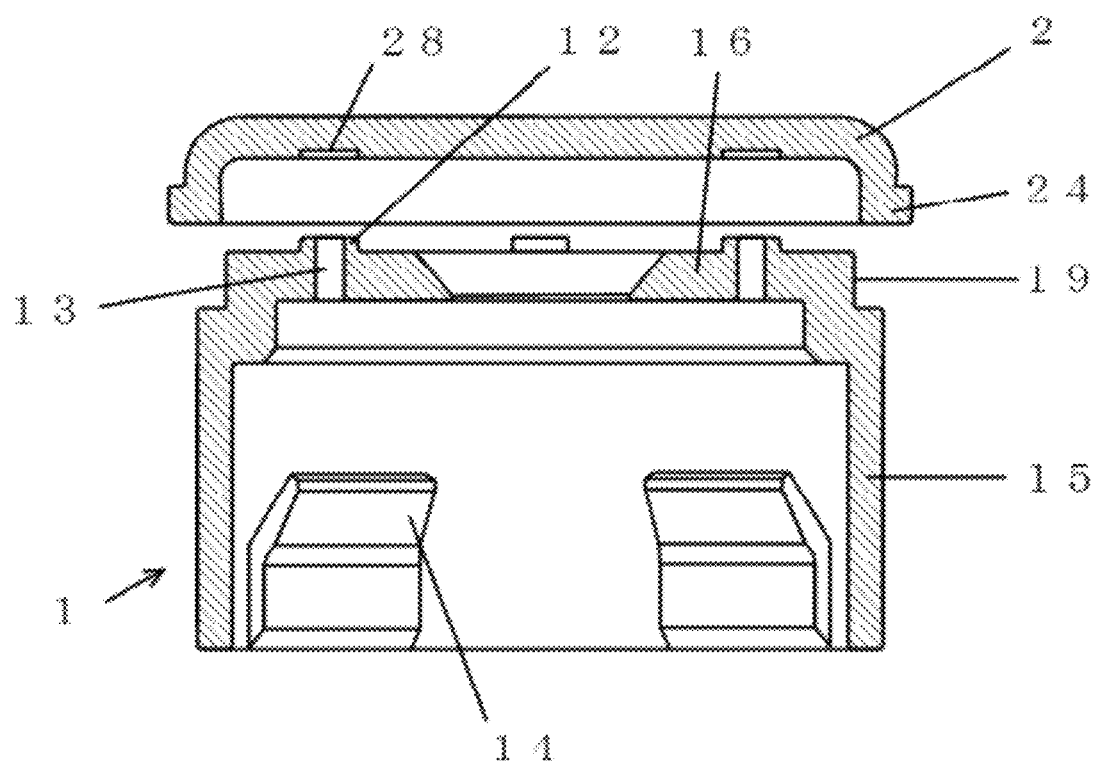
FIG. 3A is a cross-sectional view of a plastic cap according to a second embodiment of the present invention.
Figure 3B:
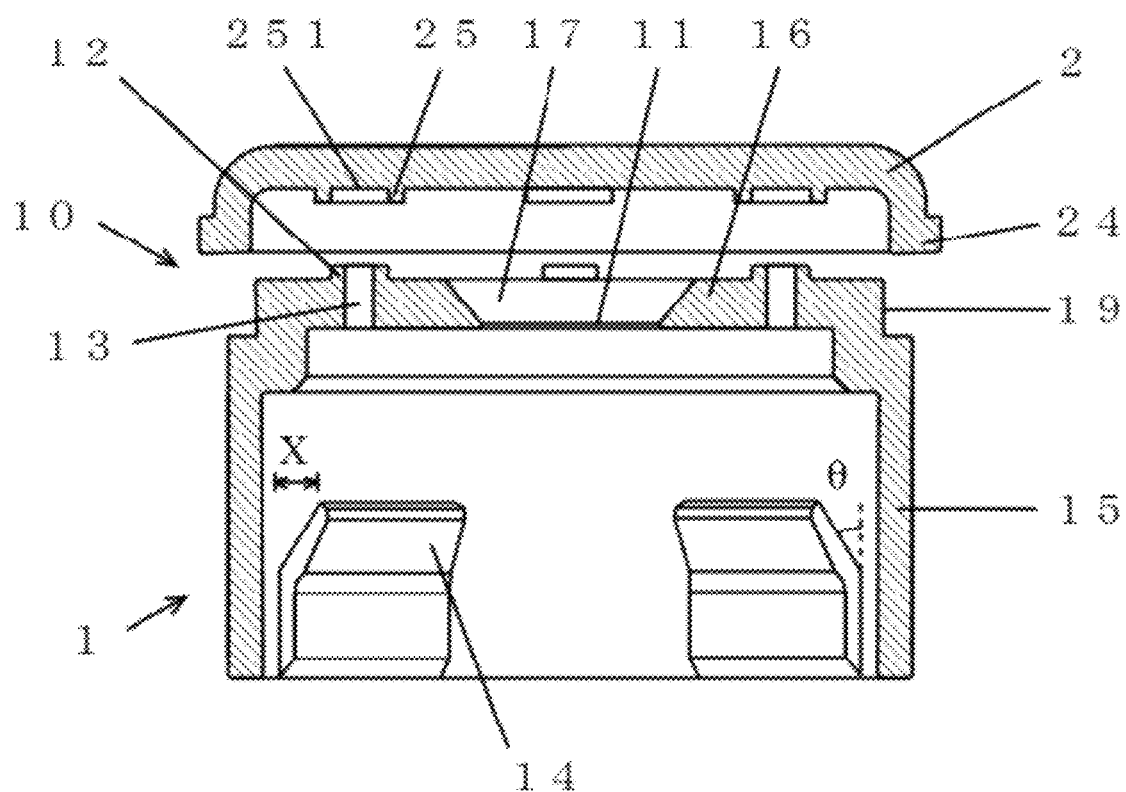
FIGS. 3B to 3D are cross-sectional views of first to third modifications of the second embodiment, in which fusion-bonding holes, protuberances having bores formed in conjunction with the fusion-bonding holes and/or recessed portions corresponding to the bores are formed in shapes and at locations different from the corresponding elements of structure in FIG. 3A.

Concerning the size of the cap 10, its dimensions need to be suitably determined depending on the dimensions of the mouth of a vial to which the cap 10 is applied. In general, its diameter may be from 10 to 50 mm or so while its height may be from 5 to 50 mm or so. The cap 10 is composed of at least the cap main body 1 and a cover portion 2 integrated with the main body 1 via bridge portions 3, and the present invention is characterized especially in that the bridge portions 3 have a specific structure. With reference to FIGS. 3B and 5, a description will hereinafter be made about the individual members of the cap 10.

The cap main body 1 is used by applying it to the vial 5 with the rubber plug 4 fitted beforehand in the opening 51 thereof. In this application, the cap main body 1 has a base portion 15 configured to surround the mouth of the vial 5 and a top wall 16 integrally arranged in conjunction with the base portion 15. The base portion 15 may be in any shape, for example, in the form of a circular cylinder, square cylinder, hexagonal cylinder or the like insofar as it is configured to permit surrounding the annular lip 52 arranged on an outer circumference of the mouth of the vial 5. The base portion 15 may be provided on an outer wall thereof with concavities and convexities as finger stops or holds and/or one or more slits or the like for enabling to confirm the state of fitting of the rubber plug 4 from the outside. As depicted in FIG. 3B, it is also preferred to arrange the claw portions 14, which are engageable with the annular lip 52 of the vial 5, on the inner wall of the base portion 15 of the cap main body 1, and further, to centrally arrange a window portion 11 through the top wall 16 of the cap main body 1. No particular limitation is imposed on the shape of each claw portion 14 insofar as it can come into engage with the annular lip 52. Preferably, however, each claw portion 14 may take the form of a claw that obliquely extends with a width of from 5 to 10 mm inwardly of the cap main body 1 and toward the top wall 16 from the inner wall of the base portion 15 of the cap main portion 15. When the claw portions 14 are arranged in such a form as described above, the claw portions 14 can make the engagement between the cap main body 1 and the annular lip 52 more firm compared with simple lands when the cap 10 is applied to the vial 5.

The inclined angle θ of each claw portion 14, which has been arranged as described above, relative to the inner wall of the cap main body 1 may be set preferably at from 20 to 60 degrees or so, more preferably at from 30 to 50 degrees or so. The distance X of each claw portion 14 at a free end thereof from the inner wall may be set preferably at from 1 to 5 mm or so, more preferably at from 2 to 4 mm or so. When set in these ranges, the load required to bring the cap 10 into engagement with the annular lip 52 ranges from 50 to 80 N or so, and therefore, is optimal, and moreover, the engagement of the cap 10 also becomes so firm that the cap 10 does not separate unless extremely strong force is applied. Especially when combined with a drug container having a smooth and slippery surface and a large variation in dimensional accuracy like a glass vial, the shape and dimensions of these claw portions 14 become very important from the standpoint of the engagement of the cap 10. Insofar as the claw portions 14 meet the above-described conditions, the cap 10 can be satisfactorily applied to such a drug container.

As the cap 10 is to be applied to the vial 5, it is generally preferred to centrally arrange the window portion 11 through the top wall 16 of the cap main body 1 as described above. As shown in FIG. 1, the arrangement of the window portion 11 makes it possible to expose a part of the rubber plug 4 through a central part of the top wall 16. By piercing a needle through the exposed part, the drug in the vial 5 can be dispensed. Therefore, no particular limitation is imposed on the shape or size of the window portion 11 insofar as the window portion 11 defines an opening large enough to permit piercing the needle. It is, however, preferred to arrange a chamfered portion 17 on and along an outer circumferential edge of the window portion 11 and also to form the opening of the window portion 11 in a circular shape as shown in FIG. 1, because a nurse or the like often wipes a surface of the exposed part of the rubber plug 4 with alcohol-soaked absorbent cotton or the like for disinfection after separating the cover portion 2 but before piercing the needle. These features of the window portion 11 are effective for reducing as much as possible the potential problem that the surface of the exposed part of the rubber plug 4 may remain unwiped at some area or areas thereof when the surface is wiped for disinfection.

The cover portion 2 that constitutes the cap 10 is arranged facing the top wall 16 of the cap main body 1. The cover portion 2 is constructed such that upon use, it can be separated under predetermined force by hands. This separation makes it possible to expose the top wall 16, and also, the rubber plug 4 through the opening of the window portion 11 arranged through the top wall 16. No particular limitation is imposed either on the shape or dimensions of the cover portion 2. When the window portion 11 is arranged through the top wall 16, it is however preferred, for the prevention of contamination of the rubber plug 4 to be brought into the exposed state through the window portion 11, to form the cover portion 2 in a shape and with dimensions such that the cover portion 2 can fully cover at least the window portion 11. Described specifically, because the cover portion 2 is supposed to protect the exposed surface of the rubber plug 4 until the rubber plug 4 is pierced with the needle (until use), the cover portion 2 may have preferably a larger area than the opening of the window portion 11, and more preferably, a larger area than the top wall 16 of the cap main body 1. Further, the cover portion 2 may preferably have an identical, similar or resembling shape to the top wall 16 of the cap main body 1 because uniformity can be maintained in design with the cap main body 1. When the cover portion 2 is configured to fit on an upper end 19 of the base portion 15 of the cap main body 1 as depicted in FIG. 3B, it is possible to bring about a positioning effect for the cover portion 2 relative to the cap main body 1 in addition to the assurance of uniformity in design. Such a configuration is also preferred in this respect. To facilitate the separation of the cover portion 2, it is also effective to arrange a flange 24 as a finger stop on an outer circumference of the cover portion 2.

Figure 3C:
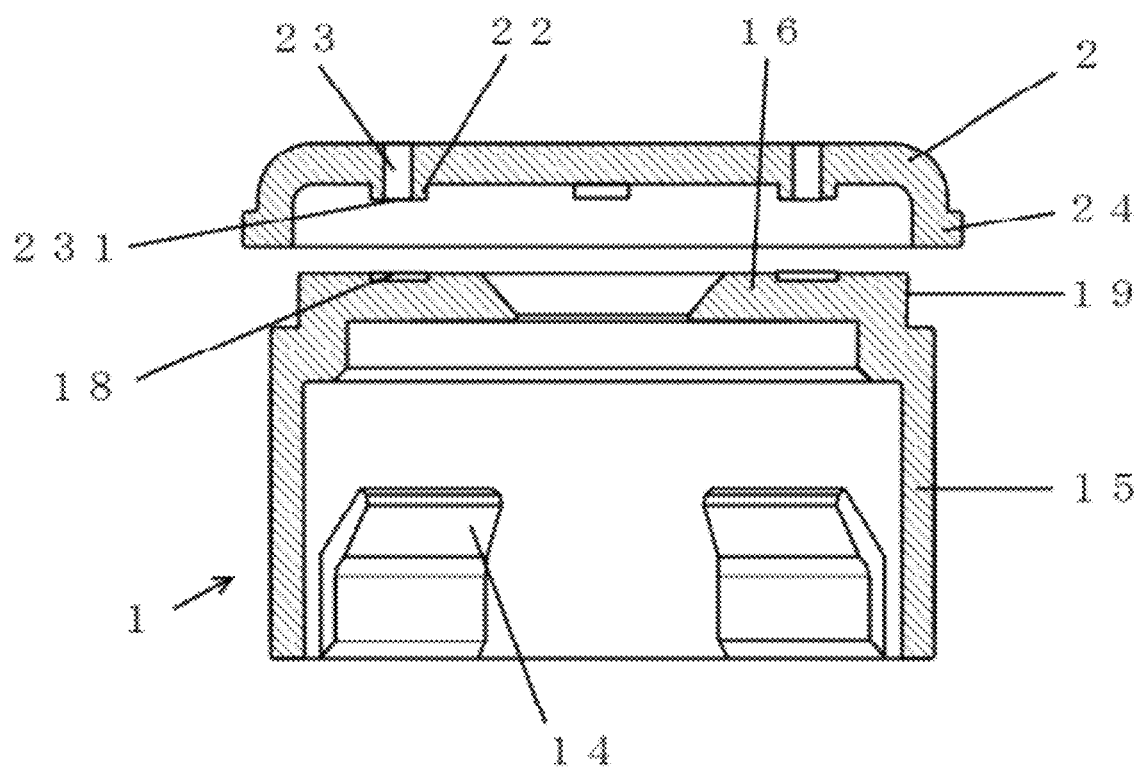

Referring next to FIGS. 3B, 3C and 5, the bridge portions will be described in further detail. The bridge portions 3 that constitute the cap 10 are formed of a synthetic plastic or the like filled in fusion-bonding holes 13 or 23 having a diameter of from 0.3 to 3 mm and arranged extending through the top wall 16 (see FIGS. 3B and 5) or the cover portion 2 (see FIG. 3C) of the cap main body 1. The bridge portions 3 are constructed such that the cap main body 1 and the cover portion 2 are integrally fusion-bonded by the bridge portions 3 and the cover portion 2 can be separated from the cap main body 1 by breaking the bridge portions 3 with hands.

From the standpoint of production, the fusion-bonding holes 13 or 23, at least one of which is essential for the cap according to the present invention, may preferably be arranged extending through the top wall 16 of the cap main body 1 or the cover portion 2 facing the upper surface of the top wall 16. The fusion-bonding holes 13 or 23 can, however, be arranged at any parts insofar as the top wall 16 of the cap main body 1 and the cover portion 2 are facing each other there. As shown in FIG. 2B, for example, fusion-bonding holes 13 may be arranged extending through inner and outer walls of the top end 19 of the base portion 15. As seen from this figure, these fusion-bonding holes 13 can be arranged with an inclination such that they extend upwardly and outwardly. A description will hereinafter be made taking as an example the first embodiment of the present invention in which the fusion-bonding holes 13 are arranged extending through the top wall 16 as shown in FIGS. 1 and 2A.

The fusion-bond strength of the synthetic plastic filled and allowed to solidify in each fusion-bonding hole 13 is the pull force that is required upon separation of the cover portion 2 from the corresponding bridge portion 3. In the first embodiment of the present invention as shown in FIGS. 1 and 2A, for example, the four fusion-bonding holes 13 are arranged at different locations so that the four bridge portions 3 are also arranged at these four locations, respectively, when the cover portion 2 has been integrated. The cover portion 2 can, therefore, be separated when pull force greater than the above-described fusion-bond strength is applied to each bridge portion 3. It is, however, not absolutely necessary to arrange these bridge portions 3 at four locations, but at least one bridge portion 3 is needed. In general, however, it is preferred to arrange about three to five bridge portions with angular intervals therebetween. When plural bridge portions 3 are arranged, their corresponding, fusion-bonding holes 13 may be arranged preferably with angular intervals therebetween such the top wall 16 of the cap main body 1 is divided at equal intervals. This is to make substantially equal the forces required to separate the cover portion 2 from the respective bridge portions 3. It is, however, to be noted that no limitation is imposed on the number of these bridge portions 3, in other words, these fusion-bonding holes 13 or their intervals. The diameter of each fusion-bonding hole 13 is set at from 0.3 to 3 mm, and may be selectively determined within this range as desired depending on the fusion-bond strength between a synthetic plastic to be used upon fusion bonding and a synthetic plastic to be used for the cap main body 1 and cover portion 2 and the target pull force to be required upon separating the cover portion 2. From the convenience of molding or the like, the cap 10 may desirably be designed such that each fusion-bonding hole 13 has a diameter of preferably from 0.5 to 2 mm or so, more preferably from 1 to 1.5 mm.

A description will next be made of ring-shaped protuberances 12 having bores 131 formed in conjunction with the fusion-bonding holes 13. With reference to FIG. 2A, these ring-shaped protuberances 12 are arranged on the upper surface of the top wall 16 of the cap main body 1, and are centrally provided with the bores 131 formed in conjunction with the fusion-bonding holes 13 arranged extending through the top wall 16. These protuberances 12 are preferably ring-shaped (cylindrical) as shown in FIG. 1, but are not limited to such a shape. The protuberances 12 can also be formed in a shape such as a triangular cylinder, square cylinder or hexagonal cylinder. As an alternative, when the fusion-bonding holes 23 are arranged extending through the cover portion 2 as depicted in FIG. 3C, such ring-shaped protuberances 22 may be arranged on the lower surface of the cover portion 2, with bores 231 being centrally formed in the ring-shaped protuberances, respectively. Although not depicted in any figure, it is also possible to construct the cap 10 such that at least one protuberance is arranged without such a bore on the upper surface of the top wall 16 of the cap main body 1 or on the lower surface of the cover portion 2 facing the upper surface, at least one fusion-bonding hole 13 or 23 is arranged on the surface facing the protuberances at a like number of location (s) opposite the protuberance(s), and the cap main body 1 and the cover portion 2 are integrated with each other with a synthetic resin.

The height of each protuberance 12 or 22 from the upper surface of the top wall 16 or the lower surface of the cover portion 2 can be set as desired, but may be preferably from 0.3 to 2 mm or so, more preferably from 0.5 to 1.2 mm or so. An excessively small height leads to the loss of a position-fixing effect to be described subsequently herein, while an unduly large height results in a large gap between the cap main body 1 and the cover portion 2 when they are integrated together, thereby raising a potential problem that foreign matter may tend to enter the gap. Neither such an excessively small height nor such an unduly large height is preferred accordingly. The diameter of each protuberance 12 or 22 is determined in accordance with the diameter of each fusion-bonding hole 13 or 23, and may be preferably from 1 to 5 mm or so, more preferably from 1.5 to 3 mm or so. An excessively small diameter provides the protuberance 12 or 22 with weak strength, while an unduly large diameter leads to an interference with the protuberance 12 or 22 when a nurse or the like uses the content of the vials. Neither such an excessively small diameter nor such an unduly large diameter is preferred accordingly.

The cap 10 may be provided, at a location opposite each protuberance described above, with a recessed portion for fixing the protuberance or with a fixing portion of such a shape that the fixing portion can fit on an outer circumference of the protuberance. Referring next to FIGS. 3A to 3D, a description will be made about recessed portions 28 and 18 and fixing portions 25. The recessed portions 28 and 18 are depicted by way of example in FIG. 3A and FIG. 3C, respectively, while the fixing portions 25 are depicted by way of example in FIG. 3B. They are arranged on the upper surface of the top wall 16 of the cap main body 1 or the lower surface of the cover portion 2, said lower surface facing the upper surface, at locations opposite the protuberances 12 or 22. As depicted in FIG. 3A and FIG. 3C, the recessed portions 28 and 18 are in the form of such concaves that they can fit on the protuberances 12 and 22, respectively. The arrangement of at least one of such recessed portions makes it possible to surely fix the corresponding protuberance at a predetermined location upon applying the cap to a container, thereby facilitating the positioning of the cap main body and the cover portion when integrally fusion-bonding them together. The fixing portions 25 are in the form of such convexities that they can fit on the outer circumferences of the protuberances 12 as depicted in FIG. 3B. The arrangement of at least one of such fixing portions makes it possible to surely fix the corresponding protuberance at a predetermined location like the above-described recessed portion, thereby facilitating and assuring the positioning of the cap main body and the cover portion when integrating them together.

Taking FIG. 3A as an example, a description will now be made. Each recessed portion 28 is arranged at a location opposite the corresponding protuberance 12. To avoid a contact between the upper surface of the top wall 16 of the cap main body 1 and the lower surface of the cover portion 2, the depth of the recessed portion 28 is set such that the protuberance 12 can be inserted (fitted) in the recessed portion 28 to about a half of its height rather than allowing to insert (fit) the protuberance 12 in its entirety. Even when the depth of the recessed portion 28 is set as described above, the cover portion 2 can still be surely fixed on a desired part of the cap main body 1 by inserting the protuberance 12 into the recessed portion 28. Also taking FIG. 3B as an example, another description will next be made. Each fixing portion 25 is arranged at a location opposite the corresponding protuberance 12, and has such a shape that the entire circumference of an inner wall of the fixing portion 25 and the entire outer circumference of the protuberance 12 can be brought into contact with each other when the protuberance 12 is fitted in the fixing portion 25. By fitting them together, the cover portion 2 can be surely fixed on a desired part of the cap main body 1.

However, the position of the cover portion 2 can be fixed insofar as the inner wall of the recessed portion 28 and the outer circumference of the inserted portion of the protuberance 12 are at least partially in contact with each other. It is, therefore, not absolutely necessary to construct the recessed portion 28 and protuberance 12 such that they can be brought into contact with each other over the entire circumferences thereof. Likewise, the contact between the inner wall of the fixing portion 25 and the outer circumference of the protuberance 12 is sufficient insofar as they are at least partially in contact with each other when fitted together. When the area of contact between each protuberance 12 and its corresponding recessed portion 28 or the area of contact between each protuberance 12 and its corresponding fixing portion 25 is partial as described above, mutual cooperation of such areas of contact at the plural bridge portions provides a modification in which the positions of the cap main body 1 and cover portion 2 can be fixed more surely.

Figure 3D:
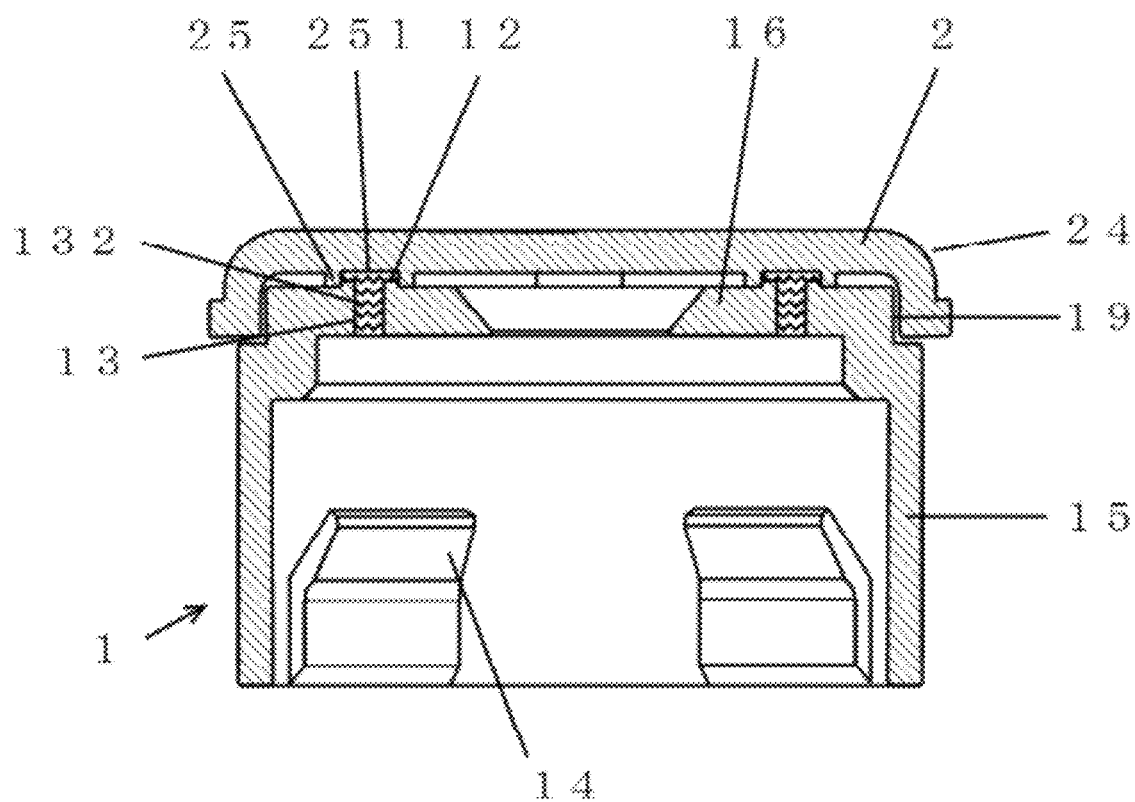

As a still further modification, the height of each protuberance 12 may be set, as depicted in FIG. 3D, lower than the depth of the recessed portion 251 (hereinafter called "the protuberance-fixing recessed portion 251") formed by the corresponding fixing portion 25 to fix the protuberance 12 so that a cavity (space) is formed between an inner wall of the protuberance-fixing recessed portion 251 and the upper surface of the protuberance 12. By also injecting and filling a molten synthetic plastic into the cavity through the corresponding fusion-bonding hole 13, the cap main body 1 and the cover portion 2 can be integrally fusion-bonded. FIG. 3D depicts the modification that includes the fixing portions 25 of the above-described construction. According to this modification, the area of contact of the synthetic plastic filled through each fusion-bonding hole 13 with the upper surface of the top wall 16 of the cap main body 1 or the lower surface of the cover portion 2 can be increased without relying upon the size of the fusion-bonding hole 13. As a consequence, the force that is needed to cause the separation of the cover portion 2 at the location of each fusion-bonding hole can be increased, thereby bringing about an advantage that the number of bridge portions can be reduced.

With reference to the individual figures illustrating the embodiments and their modifications, a description will next be made about the at least one bridge portion that characterizes the present invention. In the first embodiment shown in FIGS. 1 and 2A, the top wall 16 of the cap main body 1 is provided with the fusion-bonding holes 13 formed through the top wall 16 and the ring-shaped protuberances 12 having bores formed in conjunction with the respective fusion-bonding holes 13. When a molten synthetic plastic is filled into each fusion-bonding hole 13 from the side of the inner wall of the cap main body 1, the plastic flows through the fusion-bonding hole 13 to the flat lower surface of the cover portion 2 at the location opposite the corresponding protuberance 12. As a result, fusion bonding takes place with the synthetic plastic at an interface between the lower surface of the cover portion 2 and an upper end of the bore 131 of the protuberance 12, whereby the cap main body 1 and the cover portion 2 are integrally fusion-bonded. It is to be noted that in the first embodiment shown in FIGS. 1 and 2A, the cap main body 1 and cover portion 2 are positioned relative to each other by the upper end 19 of the base portion 15 and an inner side wall of the cover portion 2.

In the modification of the first embodiment as shown in FIG. 2B, each fusion-bonding hole 13 is formed through the upper end 19 of the base portion 15 at the inclination that they extend upwardly and outwardly. In this modification, protuberances with bored formed in conjunction with the fusion-bonding holes 13 may be formed on an outer side wall of the upper end 19 of the base portion 15 as in the first embodiment of FIG. 2A, although such protuberances are not shown in FIG. 2B.

In the cap of the second embodiment depicted in FIG. 3A, recessed portions 28 are formed in the flat lower surface of the cover portion 2, said lower surface facing the above-described protuberances 12. The recessed portions 28 are in the form of cavities in which the protuberances 12 can be inserted over the entire circumferences thereof and to about a half of their height. Except for these features, the cap according to the second embodiment has the same construction as that described with reference to FIGS. 1 and 2A. In the second embodiment, the cap main body 1 and cover portion 2 are positioned relative to each other by the upper end 19 of the base portion 15 and the inner side wall of the cover portion 2 as in the first embodiment of FIGS. 1 and 2A. In addition, the parts of the protuberances 12 are fitted in the recessed portions 28 to fix the relative positions of the cap main body 1 and cover portion 2 as described above. Accordingly, the relative positions of the cap main body 1 and cover portion 2 are more precisely and stably maintained.

The cap according to the first modification of the second embodiment as depicted in FIG. 3B has the same construction as the first embodiment of FIGS. 1 and 2A except that the flat lower surface of the cover portion 2, said lower surface facing the protuberances 12, is provided with fixing portions 25, which can surround the respective protuberances 12 over the entire circumferences thereof and are in the form of ring-shaped protuberances having the same height as the protuberances 12. This modification simply includes the protuberance-fixing recessed portions 251, which are formed by the fixing portions 25 in the forms of the ring-shaped protuberances, in place of the recessed portions 28 depicted in FIG. 3A, and therefore, can bring about the same advantageous effects as the second embodiment of FIG. 3A.

In the cap according to the second modification of the second embodiment as depicted in FIG. 3C, the fusion-bonding holes 23 and protuberances 22 are arranged on the side of the cover portion 2, and the recessed portions 18 are arranged on the side of the top wall 16 of the cap main body 1. This modification has a similar construction as the second embodiment depicted in FIG. 3A except that the fitting portions in the second embodiment are simply reversed between the cap main body 1 and the cover portion 2, and therefore, can bring about the same advantageous effects as the second embodiment of FIG. 3A.

The cap according to the third modification of the second embodiment as depicted in FIG. 3D has a similar construction as the first modification depicted in FIG. 3B. As the height of each protuberance 12 is as low as only a half of the height of the corresponding fixing portion 25, the cap of the third modification is constructed such that a synthetic plastic 132 filled in the corresponding fusion-bonding hole 13 fills up a cavity formed between the inner wall of the protuberance-fixing recessed portion 251 and the upper surface of the protuberance 12.

First and second product examples of the cap according to the first modification (FIG. 3B) of the second embodiment of the present invention, in each of which the cap main body 1 and the cover portion 2 have been integrally fusion-bonded by the bridge portions 3, will next be described based on FIGS. 4A and 4B, respectively. In the first product example illustrated in FIG. 4A, the rubber plug 4 is included as a sealing member inside the cap main body 1. The cap as the first product example has an advantage that the fitting of the rubber plug 4 in the opening provided in the mouth of the vial, to which the cap is to be applied, and the firm fixing of the fitted rubber plug 4 by the cap can be performed in a single step. In the second product example illustrated in FIG. 4B, the construction of the present invention has been applied to a cap 30 which is generally called a "closure" and is used primarily for an infusion bottle. In this second product example, a flat packing 6 is used as a sealing member. The flat packing 6 is held in place by a retainer ring 7 inside a base portion 35 of a cap main body 31.

Figure 4A:
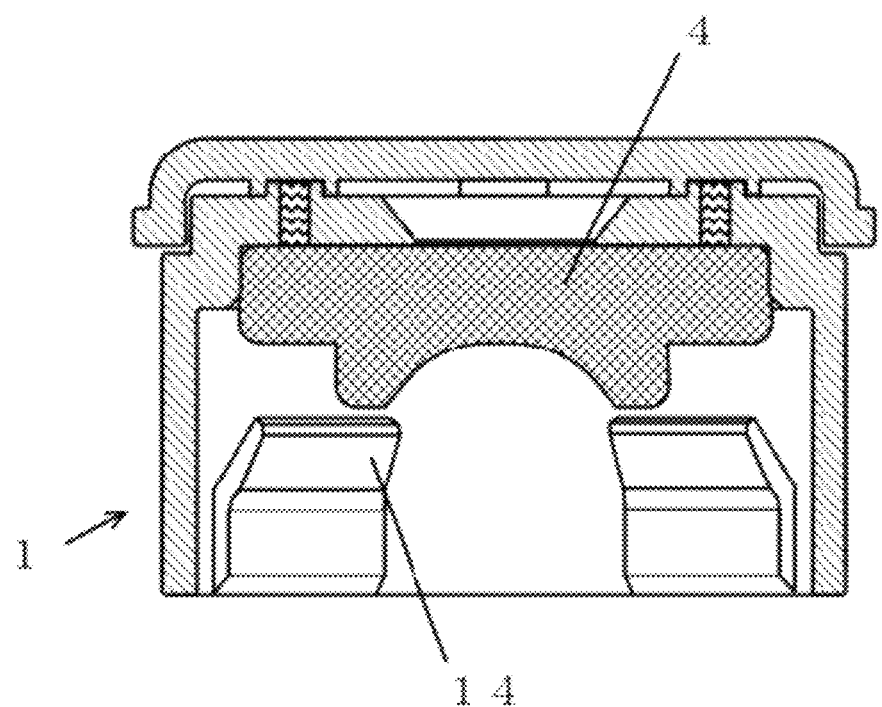
FIG. 4A is a cross-sectional view illustrating a first product example in which the plastic cap according to the first modification (FIG. 3B) of the second embodiment is combined with a rubber plug as a sealing member.
Figure 4B:
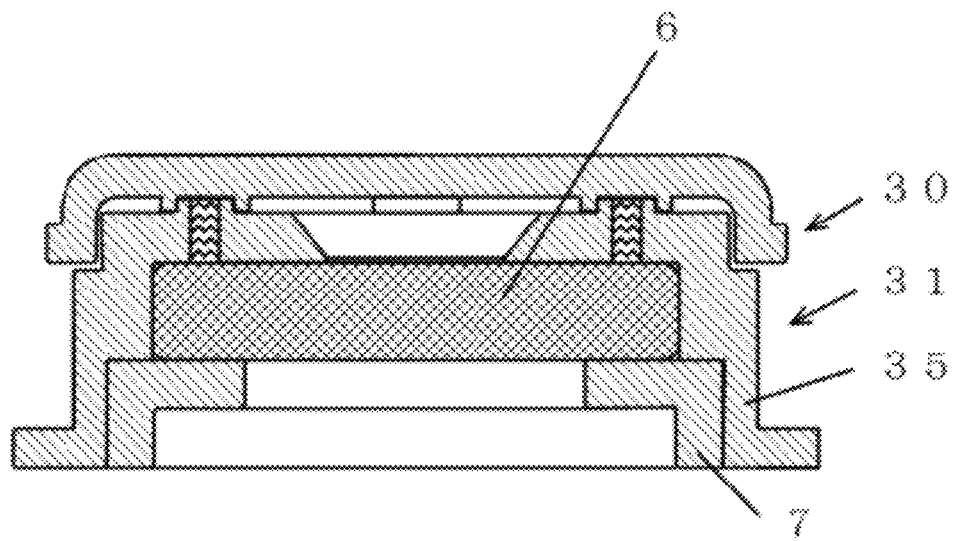
FIG. 4B is a cross-sectional view similar to FIG. 4A, but depicts a second product example in which a flat packing is included as a sealing member.

FIG. 5 shows the vial 5 sealed by the first product example illustrated in FIG. 4A.

A description will next be made of the method for producing the cap according to the present invention. First, taking as an example the cap 10 according to the first modification of the second embodiment of the present invention as depicted in FIG. 35, the production method will be described. The cap main body 1 with the fusion-bonding holes 13 and protuberances 12 arranged thereon and the cover portion 2 with the fixing portions 25 arranged on the lower surface thereof are injection-molded beforehand in their corresponding molds. Subsequently, the thus-molded cap main body 1 and cover portion 2 are taken out of the respective molds, and are combined together and inserted in a bridge-portion forming mold. After clamping, a molten synthetic plastic is injected into the fusion-bonding holes 13 arranged on the side of the cap main body 1. The injected plastic flows through the fusion-molding holes 13, and stops when it reaches the lower surface of the cover portion 2. The plastic filled in the fusion-molding holes 13 is allowed to solidify, and as a result, the cap main body 1 and the cover portion 2 are integrally fusion-bonded by the resulting bridge portions 3.

As another example of the production method, there is also a method that includes forming a cap main body 1 in a mold; inserting a cover portion 2, which has been formed beforehand on the side, into the mold for the cap main body 1 to combine them together; clamping the mold; and then performing secondary injection of a molten plastic into fusion-bonding holes 13 to integrate them together.

As a further example of the production method, there is also a method that includes providing a single mold having both a cavity for forming a cap main body and a cavity for forming a cover portion; forming a cap main body 1 and a cover portion 2, respectively, by primary injection, sliding the mold to combine them together; and then performing secondary injection of a molten plastic into fusion-bonding holes 13 to integrate them together.

The cap according to the present invention can be obtained by any one of the above-exemplified production methods, but its production shall not be limited to these exemplified methods. The above description was made taking injection molding as an example, but needless to say, the present invention shall not be limited to production methods making use of injection molding.

The cap according to the present invention can be produced by various simple methods such as those described above, and any mold can be used insofar as its construction enables to hold the cap main body 1 and cover portion 2 at predetermined positions and to inject a molten synthetic plastic at a predetermined pressure into the fusion-bonding holes 13. The production method according to the present invention, therefore, has an advantage that the degree of freedom in product shape is high.

For the cap according to the present invention, a general-purpose plastic such as polypropylene, polyethylene or a polycarbonate can be used. However, polypropylene which has adequate flexibility and hardness is preferred from the demands that the claw portions of the cap be provided with good functionality and the included sealing member be firmly held in place. Further, a plastic having heat resistance to 121° C. or higher and radiation resistance is preferred because the cap according to the present invention is expected to be subjected together with a container to sterilization treatment. Such plastic materials are generally available on the market. The at least one bridge portion can also be formed with such a general-purpose thermoplastic resin as described above. More specifically, the present invention can include, for example, following embodiments: (1) the cap main body, cover portion and at least one bridge portion are all formed of polypropylene; (2) the cap main body and cover portion are formed of polypropylene, and the at least one bridge portion is formed of polyethylene; and (3) the cap main body and at least one bridge portion are formed of polypropylene, and the cover portion is formed of polyethylene.

The present invention will next be described more specifically based on examples and comparative examples.

Example 1

Produced were 10 caps having a structure specified in the present invention (the construction of FIGS. 1 and 2A) and made of polypropylene ("PRIME POLYPRO™ J105G", trade name; product of Prime Polymer Co., Ltd.). More specifically, each cap had the following dimensions—the outer diameter of a cap main body 1: 24 mm, the height of the cap main body 1: 14 mm, the diameter of each fusion-bonding hole 13: 1 mm, the outer diameter of each protuberance 12: 2 mm, the height of each protuberance 12 from an upper surface of a top wall 16 of the cap main body 1: 0.5 mm, and the outer diameter of a cover portion 2 (excluding a flange 24): 24 mm. Further, four bridge portions 3 (see FIG. 5) were arranged at equal intervals in much the same way as shown in FIG. 1.

Example 2

Ten polypropylene caps were produced as in Example 1 except that four recessed portions 28 of the below-described shape and dimensions were arranged on a lower surface of a cover portion 4, said lower surface being in contact with protuberances 12 formed in conjunction with bridge portions 3, respectively (the construction of FIG. 3A). Each recessed portion 28 was cylindrical, its diameter was 2.2 mm, and its depth from the lower surface of the cover portion 2 was 0.2 mm.

Example 3

Ten polypropylene caps were produced as in Example 1 except that four fixing portions 25 of the below-described shape and dimensions were formed to be brought into contact with the outer circumferences of the protuberances 12 for fixing their relative positions with the protuberances 12 (the construction of FIG. 3B). Each fixing portion 25 was ring-shaped (cylindrical), its inner diameter was 2.2 mm, its outer diameter was 3.4 mm, and its height from the lower surface of the cover portion 2 was 0.5 mm.

Comparative Example 1

Figure 6:
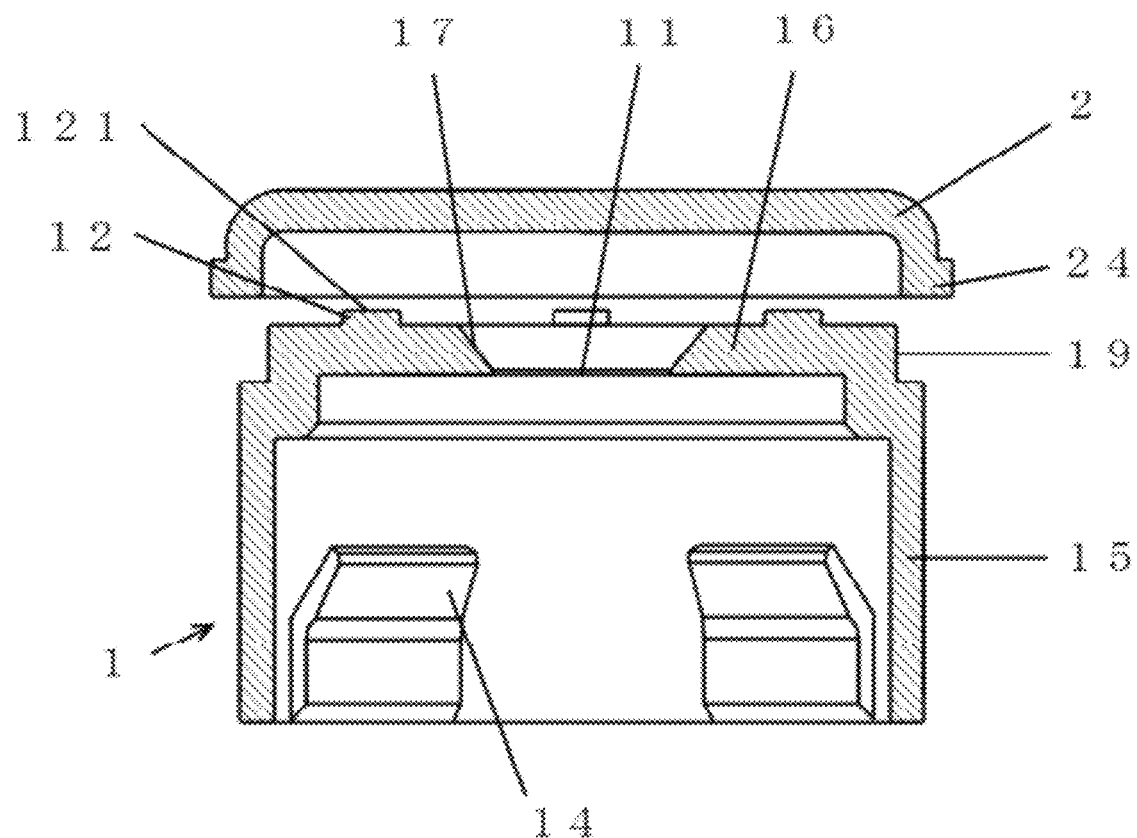
FIG. 6 is a cross-sectional view similar to FIG. 2A, but shows an illustrative conventional plastic cap.

Produced were 10 polypropylene caps of the same structure and dimensions as those of Example 1 except that without arranging the fusion-bonding holes 13, solid, circular cylindrical protuberances 12 were arranged there as shown in FIG. 6 and the joining between a cap main body 1 and a cover portion 2 was made with an adhesive. Specifically, for joining the cap main body 1 with the cover portion 2, an adhesive ("ARON ALPHA®"; product of boa Gosei Co., Ltd.) was applied to upper surfaces 121 of the protuberances 12, said upper surfaces 121 being to be brought into contact with the lower surface of the cover portion 2, and the protuberances 12 and the cover portion 2 were integrated together.

Comparative Example 2

Produced were 10 caps of similar shape and dimensions as those of Comparative Example 1. A cap main body 1 and a cover portion 2 were integrated together by ultrasonic welding of the upper surfaces 121 of the protuberances 12, said upper surfaces 121 being to be brought into contact with the lower surface of the cover portion (ultrasonic welder: "SONOPET Σ1200", trade name; manufactured by Seidensha Electronics Co., Ltd.). Welding conditions will be summarized below in Table 1.

TABLE 1

| Welding Conditions | |
|---|---|
| Energy | 20.0 Ws |
| Amplitude | 18 μm (100%) |

TABLE 1-continued

| Welding Conditions | |
|---|---|
| Pressure level | 0.01 MPa (10%) |
| Holding time | 2.0 seconds |

Cover-Portion Separation Test

Into openings of mouths of CZ® vials ("VIAL 10A20-2", trade name; products of Daikyo Seiko, Ltd.), rubber plugs for vials (model: V10-75-2, products of Daikyo Seiko, Ltd.; which had a similar shape as the rubber plug illustrated in FIGS. 4A and 5) were fitted, respectively. By a capping machine, samples of the caps of Examples 1 to 3 and Comparative Examples 1 and 2 were applied to and secured on the mouths of the respective vials with the rubber plugs fitted therein. Using a fixing jig, each vial capped as described above was fixed on an autograph (model: AG-5kNIS MS Type, 500 N load cell; manufactured by Shimadzu Corporation). A pulling test jig was brought into engagement with the flange of the cover portion. By raising the pulling test jig at a rate of 100 mm/min, the pull force to be required to separate the cover portion from the cap main body was measured in terms of load (N). Ten (10) test replications were conducted with respect to the cap of each of Examples 1 to 3 and Comparative Examples 1 and 2.

The measurement results are presented in Table 2. It was confirmed from the measurement results that with each of the caps of Examples 1 to 3, the separation load varied less with a small standard deviation and was stable compared with the caps of Comparative Examples 1 and 2.

TABLE 2

| | Results of Cover-portion Separation Test | | | | |
|---|---|---|---|---|---|
| | Example 1 | Example 2 | Example 3 | Comp. Ex. 1 | Comp. Ex. 2 |
| Measured value (unit: N) | 18.40 | 18.54 | 17.76 | 23.89 | 12.03 |
| | 18.65 | 18.33 | 18.50 | 7.41 | 10.78 |
| | 18.11 | 18.26 | 18.66 | 24.19 | 4.32 |
| | 19.20 | 18.65 | 19.23 | 36.58 | 5.88 |
| | 18.45 | 19.23 | 18.36 | 15.85 | 13.42 |
| | 17.85 | 18.48 | 18.41 | 39.23 | 11.84 |
| | 18.39 | 18.75 | 18.68 | 19.11 | 6.43 |
| | 18.52 | 18.46 | 19.31 | 29.44 | 12.45 |
| | 19.32 | 18.48 | 18.38 | 15.11 | 4.68 |
| | 18.66 | 19.38 | 17.95 | 19.11 | 10.52 |
| Average | 18.56 | 18.66 | 18.52 | 22.99 | 9.24 |
| Standard deviation | 0.44 | 0.37 | 0.49 | 9.88 | 3.50 |

According to the present invention, a plastic cap useful especially as a cap for drug container can be provided. The cap is free from accidental separation of its cover portion, its main body and cover portion are integrally fusion-bonded with extremely stable joint strength without occurrence of variations among its products, and the cover portion can be readily separated from the cap main body by hands upon use. As the injection molding at the time of fusion bonding is required only to the fusion-bonding holes, a high degree of freedom can be enjoyed on the shapes of the cap main body and cover portion, no complex mold structure is needed for the fusion bonding, and the plastic is required only in a small quantity for the fusion bonding.

What is claimed is:
1. A plastic cap that securely maintains a sealed state of a container that has a mouth having an opening defined therein and sealed with a sealing member, the plastic cap comprising:

a cap main body formed of first plastic resin;
a cover portion formed of second plastic resin;
at least one bridge portion; and
at least one protuberance having a bore therein,
wherein the cover portion is integrated with the cap main body via integral fusion-bonding provided by the at least one bridge portion,
the cap main body, the cover portion, and the bridge portion are formed as different components from each other,
the cap main body has a base portion, which is configured so as to surround the mouth of the container to which the cap is applied, and a top wall integrally arranged so as to be continuous to the base portion,
the cover portion is arranged facing the top wall of the cap main body,
the at least one bridge portion is formed of third plastic resin, which is a synthetic thermoplastic resin, filled in at least one fusion-bonding hole and in the bore, which is continuous to the at least one fusion-bonding hole,
both the at least one fusion-bonding hole and the at least one protuberance having the bore are present together in only one of the cap main body and the cover portion,
wherein the at least one protuberance is formed on an upper surface of the top wall of the cap main body or a lower surface of the cover portion, and the lower surface of the cover potion is facing the upper surface of the top wall of the cap main body,
the at least one bridge portion is in a shape corresponding to a combined shape of the at least one fusion-bonding hole and the bore in the at least one protuberance,
the integral fusion-bonding between the cap main body and the cover portion is provided at an interface between an end surface of the bridge portion, which is an end surface of the bore of the at least one protuberance, and one of the lower surface of the cover portion and the upper surface of the cap main body, which is facing the protuberance and in which the at least one fusion-bonding hole and the at least one protuberance are not formed,
the at least one fusion-bonding hole has a diameter in a range from 0.3 to 3 mm and is arranged extending through the only one of the cap main body and the cover portion such that the cap main body and the cover portion are integrally fusion-bonded by the at least one bridge portion,
the cover portion is separable from the cap main body by separating by hand the at least one bridge portion formed in one of the cover portion and the cap main body from other one of the cover portion and the cap main body in which the at least one bridge portion is not formed, and
a standard deviation of pull force required to separate the cover portion from the cap main body of the plastic cap is smaller than a standard deviation of pull force required to separate a cover portion from a cap main body of a same plastic cap except that the cover portion and the cap main body are integrated by ultrasonic welding of the at least one protuberances, the ultrasonic welding being applied at 20.0 Ws, an amplitude of 18 µm, and a pressure of 0.01 MPa for 2.0 seconds, where the pull force is measured with 10 each of the plastic caps produced in a same way by pulling the cover portion from the cap main body at a pulling rate of 100 mm/min.

2. The plastic cap according to claim 1, the plastic cap further comprising at least one recessed portion or at least one fixing portion, on the upper surface of the top wall of the cap main body or the lower surface of the cover portion, and at a location opposite to the at least one protuberance,
wherein the at least one recessed portion fixes the protuberance, and the at least one fixing portion is configured so as to fit on an outer circumference of the protuberance.

3. The plastic cap according to claim 1, wherein the plastic cap has the bridge portions as defined in claim 1 in a number from three to five portions, wherein the bridge portions are arranged with angular intervals therebetween.

4. The plastic cap according to claim 1, the plastic cap further comprising:
at least one component selected from the group consisting of a land portion and a claw portion; and
a window portion,
wherein the at least one component is arranged on an inner wall of the base portion of the cap main body and engages with an annular lip arranged on an outer circumference of the mouth of the container,
the window portion is centrally arranged through the top wall of the cap main body, and
the cover portion is configured so as to cover at least the window portion.

5. The plastic cap according to claim 1,
wherein the plastic cap further comprises the sealing member so that the sealing member is placed between the opening of the mouth of the container and the top wall of the cap main body upon capping of the mouth of the container.

6. A production method of a plastic cap that securely maintains a sealed state of a container that has a mouth having an opening defined therein and sealed with a sealing member, the method comprising:
a step of filling a molten third plastic resin, which is a synthetic thermoplastic resin, in at least one fusion-bonding hole and a bore, which is continuous to the at least one fusion-bonding hole, in at least one protuberance of the plastic cap; and
solidifying the molten synthetic thermoplastic resin,
wherein said plastic cap comprises:
a cap main body formed of first plastic resin; and
a cover portion that is integrated with the cap main body via integral fusion-bonding provided by at least one bridge portion and formed of second plastic resin; and
the at least one protuberance having the bore therein,
the cap main body, the cover portion, and the bridge portion are formed as different components from each other,
said cap main body has a base portion, which is configured so as to surround the mouth of the container to which the cap is applied, and a top wall integrally arranged so as to be continuous to the base portion,
upon integrating, via the at least one bridge portion, the cover portion faces the top wall of the cap main body,
both the at least one fusion-bonding hole and the at least one protuberance having the bore are present together in only one of the cap main body and the cover portion,
wherein the at least one protuberance is formed on an upper surface of the top wall of the cap main body or a lower surface of the cover portion, and the lower surface of the cover potion is facing the upper surface of the top wall of the cap main body,
the at least one bridge portion is in a shape corresponding to a combined shape of the at least one fusion-bonding hole and the bore in the at least one protuberance, the integral fusion-bonding between the cap main body and the cover portion is provided at an interface between an end surface of the bridge portion, which is an end surface of the bore of the at least one protuberance, and one of the lower surface of the cover portion and the upper surface of the cap main body, which is facing the protuberance and in which the at least one fusion-bonding hole and the at least one protuberance are not formed, the at least one fusion-bonding hole has a diameter in a range from 0.3 to 3 mm and is arranged extending through only one of the cap main body and the cover portion such that the cap main body and the cover portion are integrally fusion-bonded by the at least one bridge portion, the cover portion is separable from the cap main body by separating by hand the at least one bridge portion formed in one of the cover portion and the cap main body from other one of the cover portion and the cap main body in which the at least one bridge portion is not formed, and a standard deviation of pull force required to separate the cover portion from the cap main body of the plastic cap is smaller than a standard deviation of pull force required to separate a cover portion from a cap main body of a same plastic cap except that the cover portion and the cap main body are integrated by ultrasonic welding of the at least one protuberances, the ultrasonic welding being applied at 20.0 Ws, an amplitude of 18 μm, and a pressure of 0.01 MPa for 2.0 seconds, where the pull force is measured with 10 each of the plastic caps produced in a same way by pulling the cover portion from the cap main body at a pulling rate of 100 mm/min.

7. The plastic cap according to claim 1,
wherein the cap comprises at least one resin selected from the group consisting of polypropylene, polyethylene, and polycarbonate.

8. The plastic cap according to claim 1,
wherein each of the first plastic resin for the cap main body, the second plastic resin for the cover portion, and the third plastic resin for the at least one bridge portion comprises polypropylene.

9. The plastic cap according to claim 1,
wherein the first plastic resin for the cap main body and the second plastic resin for the cover portion comprise polypropylene, and the third plastic resin for the at least one bridge portion comprises polyethylene.

10. The plastic cap according to claim 1,
wherein the first plastic resin for the cap main body and the third plastic resin for the at least one bridge portion comprise polypropylene, and the second plastic resin for the cover portion comprises polyethylene.

11. The plastic cap according to claim 1,
wherein the shape of the at least one bridge portion is a cylindrical shape.

12. The plastic cap according to claim 1,
wherein the bore formed in the protuberance has a same dimeter as the diameter of the at least one fusion-bonding hole.

13. The plastic cap according to claim 1, wherein the at least one bridge portion is retained entirely within the at least one fusion-bonding hole and the bore.

* * * * *